US010527478B2

(12) United States Patent
Hogdahl

(10) Patent No.: US 10,527,478 B2
(45) Date of Patent: Jan. 7, 2020

(54) TANK FLUID LEVEL MEASURING DEVICE

(71) Applicant: Per Ola Hogdahl, Evergreen, CO (US)

(72) Inventor: Per Ola Hogdahl, Evergreen, CO (US)

(*) Notice: Subject to any disclaimer, the term of this patent is extended or adjusted under 35 U.S.C. 154(b) by 71 days.

(21) Appl. No.: 16/030,236

(22) Filed: Jul. 9, 2018

(65) Prior Publication Data
US 2019/0017860 A1    Jan. 17, 2019

Related U.S. Application Data

(60) Provisional application No. 62/531,442, filed on Jul. 12, 2017.

(51) Int. Cl.
*G01F 23/00* (2006.01)
*G01F 23/40* (2006.01)

(52) U.S. Cl.
CPC .......... *G01F 23/0023* (2013.01); *G01F 23/40* (2013.01)

(58) Field of Classification Search
CPC combination set(s) only.
See application file for complete search history.

(56) References Cited

U.S. PATENT DOCUMENTS

| 1,997,002 | A | * | 4/1935 | Ledoux | G01F 23/34 73/317 |
| 2,255,310 | A | * | 9/1941 | Arcey | G01F 23/34 73/317 |
| 5,887,616 | A | * | 3/1999 | Ikeda | B60K 15/061 116/227 |
| 2010/0242597 | A1 | * | 9/2010 | Powell | G01F 23/0069 73/311 |
| 2011/0277546 | A1 | * | 11/2011 | Armitage | G01F 23/44 73/311 |
| 2018/0195891 | A1 | * | 7/2018 | Baron | G01F 23/303 |

* cited by examiner

*Primary Examiner* — Nathaniel J Kolb
(74) *Attorney, Agent, or Firm* — Trenner Law Firm, LLC; Mark D. Trenner

(57) ABSTRACT

A device for measuring the level of a material (e.g., a liquid) in a tank is disclosed. An example device includes a non-buoyant flexible member and a plurality of sensor nodes distributed along the length of the flexible member. The sensor nodes are configured to indicate a change in orientation. A buoyant float provides a generally U-shape configuration for the flexible member, and causes an increasing number of the sensing nodes to depart from a substantially vertical orientation as the level of the material rises within the storage tank. A monitor is configured to monitor a signal indicating the change in orientation of the sensor nodes. As such, the device may be implemented to conveniently and accurately measure the liquid level in the tank.

20 Claims, 4 Drawing Sheets

TANK FLUID LEVEL MEASURING DEVICE

CROSS REFERENCE TO RELATED APPLICATIONS

This application claims the priority benefit of U.S. Provisional Patent Application No. 62/531,442 filed Jul. 12, 2017 for "Tank Liquid Level Measuring Device" of Per Ola Hogdahl, hereby incorporated by reference in its entirety as though fully set forth herein.

BACKGROUND

The measurement of fluid levels in storage fluid tanks is a widespread need that presents numerous problems. Many solutions exist to measure liquid levels in tanks, including sophisticated continuous level monitoring instruments, and simple devices designed to detect single levels or a few discrete levels. Tanks may also be gauged manually, which may be inconvenient and/or unsafe, and may not provide consistent recorded data with desired frequency. As such, there are numerous liquid tanks in remote locations throughout the United States that are not monitored at all, because the existing measurement devices are too costly or present significant logistical challenges.

DETAILED DESCRIPTION

The field of tank fluid level measurement has experienced a long-felt need for a continuous level gauge with high reliability, low cost, a simple installation process, and few or no moving parts. With the advent of low cost cellular data coverage (for example, using IoT hardware to communicate via the LTE Cat-M cellular band), it is now possible to transmit data inexpensively from remote locations. However, economical continuous measurement in these locations may still require a low-powered and inexpensive sensor that performs reliably under harsh field conditions.

Disclosed herein is a tank fluid level measuring device. In an example, the tank fluid level measuring device includes a flexible member with a plurality of sequentially coupled sensor nodes distributed along a length (some, a portion, or all) of the flexible member. Each of the sensor nodes includes an inclinometer or tilt switch configured to indicate when it is tilted away from a substantially vertical orientation. The flexible member and the sequence of sensor nodes are connected at one end to a monitor in association with (e.g., attached to) the tank. A buoyant float is affixed to the other end of the flexible member, such that the buoyant float rests on the surface of a fluid or at an interface between material (e.g., two fluids and/or components of fluids or liquids). The flexible member is non-buoyant in the liquid and thus hangs in a generally U-shaped form between the float and the monitor.

The tank fluid level measuring device may be simple in design, resulting in low cost, high reliability, and ease of installation. In an example, the tank fluid level measuring device may be somewhat less accurate than other, perhaps even more expensive, measurement devices. However, in most applications, this trade off in accuracy may be far less important than the continuous, low-cost access to reliable data provided by the present device.

Before continuing, it is noted that as used herein, the terms "includes" and "including" mean, but is not limited to, "includes" or "including" and "includes at least" or "including at least." The term "based on" means "based on" and "based at least in part on."

Figure 1A:
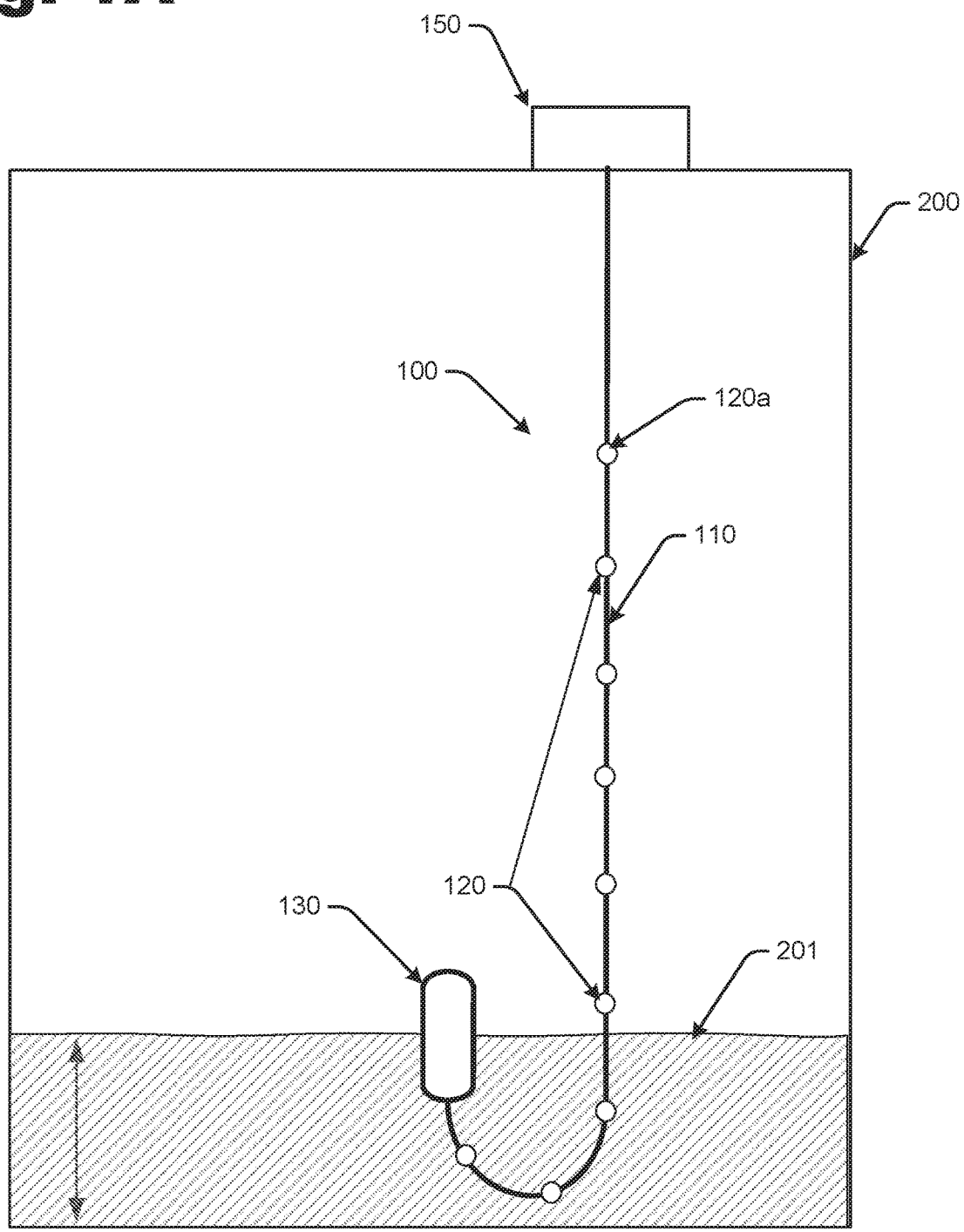
FIG. 1A is an illustration of an example tank fluid level measuring device in a tank with a low liquid level.

FIG. 1A is an illustration of the tank fluid level measuring device 100 in a tank 200 partially filled with a fluid 201. In an example, the fluid 201 is at a level of less than about 10%. The device 100 is shown in FIG. 1A as it may be attached to tank 200, and include monitor 150, sensor nodes 120, flexible member 110 and buoyant float 130.

In an example, the monitor 150 is provided in association with the tank 200. This association may be by any of a variety of methods, including but not limited to bolts, straps, adhesives, or magnets. In general the monitor 150 may be attached to the exterior of the tank 200, although in some cases it could also be attached to the interior, or to a nearby object. In principle it could even be allowed to dangle from, or rest next to the tank unsecured on the ground or on a floor or platform.

The monitor 150 and each of the sensor nodes 120 may communicate over a signal link in the flexible member 110. The sensor link may be any suitable communications link, including wired and/or wireless. In an example, the sensor nodes 120 also sequentially coupled along at least a portion of the flexible member 110, with the closest sensor node 120a communicatively coupled to the monitor 150. Other coupling arrangements may also be employed.

In an example, the tank 200 is a vessel or other container for fluid or liquid material 201. The tank 200 may also include gases (e.g., in the headspace above the fluid or liquid material 201). In the example shown, each sensor node 120 is communicatively coupled to the monitor 150, e.g., in a sequential manner along the flexible member 110. In this example, each of sensor nodes 120 is coupled electrically to control node 150 thru a signal link in the flexible member 110.

The float 130 is provided at an interface, such as an interface between the surface of a fluid with a headspace of gas above it. In an example, the flexible members stiffness and/or weight is controlled so as to provide for a known and controlled bending radius.

Each of the sensor nodes 120 may include a sensor to detect inclination of the node. The sensor nodes 120 may include, but is not limited to, a conductive liquid tilt switch (e.g., a mercury switch or electrolyte switch), accelerometers, strain gauges, micro-electromechanical system (MEMS) sensors, electrical sensors, or magnetic compass. The sensor nodes 120 may also include other sensing equipment, along with the circuitry to operate it. In an example, the sensor node 120 may also include a transceiver portion for communication with monitor 150. In some examples, the transceiver portion may include a wireline transceiver for communicating over the flexible member 110 via a wire, optical fiber, or other medium. In an example, each of sensor nodes 120 may also include a processing portion for receiving sensor information, and for amplifying, scaling, modifying, adjusting, digitizing, or converting the information, as well as for controlling the transceiver portion and sensor portion.

In an example, the monitor 150 includes equipment for receiving information from each of the sensor nodes 120. Information may include at least a status (e.g., an orientation) of the associated sensor node. However, other information (e.g., temperature, time, etc.) may also be included and/or provided separately.

In an example, the monitor 150 includes equipment to support the flexible member 110 with the sensor nodes 120. The monitor 150 may also include power sources, communication interfaces, as well as a computer system, microprocessor, circuitry, and/or other processing device(s) and/or software, and in another example, may even be distributed among multiple processing devices. In some examples, the monitor 150 may include complementary and/or additional sensors. The monitor 150 may be attached to the tank 200 by any suitable means, including but not limited to bolts, adhesives, straps, hooks, or magnets.

In an example, the flexible member 110 includes a composite or polymer rod, tube or similar structure. The flexible member 110 provides tensional support, such as may be provided by one or more wire, cable, rope, cord, or sheathing.

The flexible member 110 may also include electrical wire and/or optical fiber for coupling with the sensor nodes 120. In an example, the flexible member 110 may include several segments, which together form the some or all of the member provided between the monitor 150 and one or more of the sensor nodes 120.

In an example, the flexible member 110 may include or employ various communication media, such as air, metal, optical fiber, and/or other signal propagation path, including combinations thereof. In an example, the flexible member 110 may carry signals of any of various communication protocols, including but not limited to Universal Serial Bus (USB), Internet Protocol (IP), Ethernet, Controller Area Network (CAN) bus, Inter-Integrated Circuit (I2C), 1-Wire, optical, optical networking, circuit-switched, communication signaling, and/or other communication format, including combinations, improvements, or variations thereof. The flexible member 110 may be a direct link or may include intermediate networks, systems, or devices.

In operation, the sensor nodes 120 are positioned along the flexible member 110 at different distances from the monitor 150 and the float 130. The sensor nodes 120 may be suspended from the monitor 150 and float 130 within the tank 200, such that the measured orientation of the sensor nodes 120, when examined collectively, provide information about the level of the fluid 201 within the tank 200.

In the example depicted in FIG. 1A, tank 200 is partially filled with a fluid 201, to a level of less than about 10%. In this example, seven out of nine sensor nodes 120 are hanging in a substantially vertical position. The remaining three sensor nodes 120 are hanging in a substantially non-vertical position. Since all non-vertical sensors may be presumed to hang beneath the surface of the fluid 201, the spacing between each sensor node 120 and the monitor 150 is known. Therefore, this information can be used to determine the depth of the fluid 201.

In an example, the submerged portion of the flexible member has three portions. A vertical section on the control unit side, a curved section (a half circle except for at very low tank levels) and another vertical section between the float and the curved section (at tank levels higher than about three feet). Thus there is often a section below the surface where the tilt switches remain in a vertical orientation (in addition to all the no-longer vertical switches).

By incorporating a non-sliding, non-hinged float, the tank fluid level measuring device eliminates possibilities for friction and sticking of the float, thus providing high reliability, at low cost. However, because the tank fluid level measuring device 100 is substantially long, narrow, and flexible in shape, it can be readily installed into a tank 200 through an ordinary tank fitting aperture. Thus, the configuration may also provide low installation cost, and low replacement cost for measuring tank fluid level.

Figure 1B:
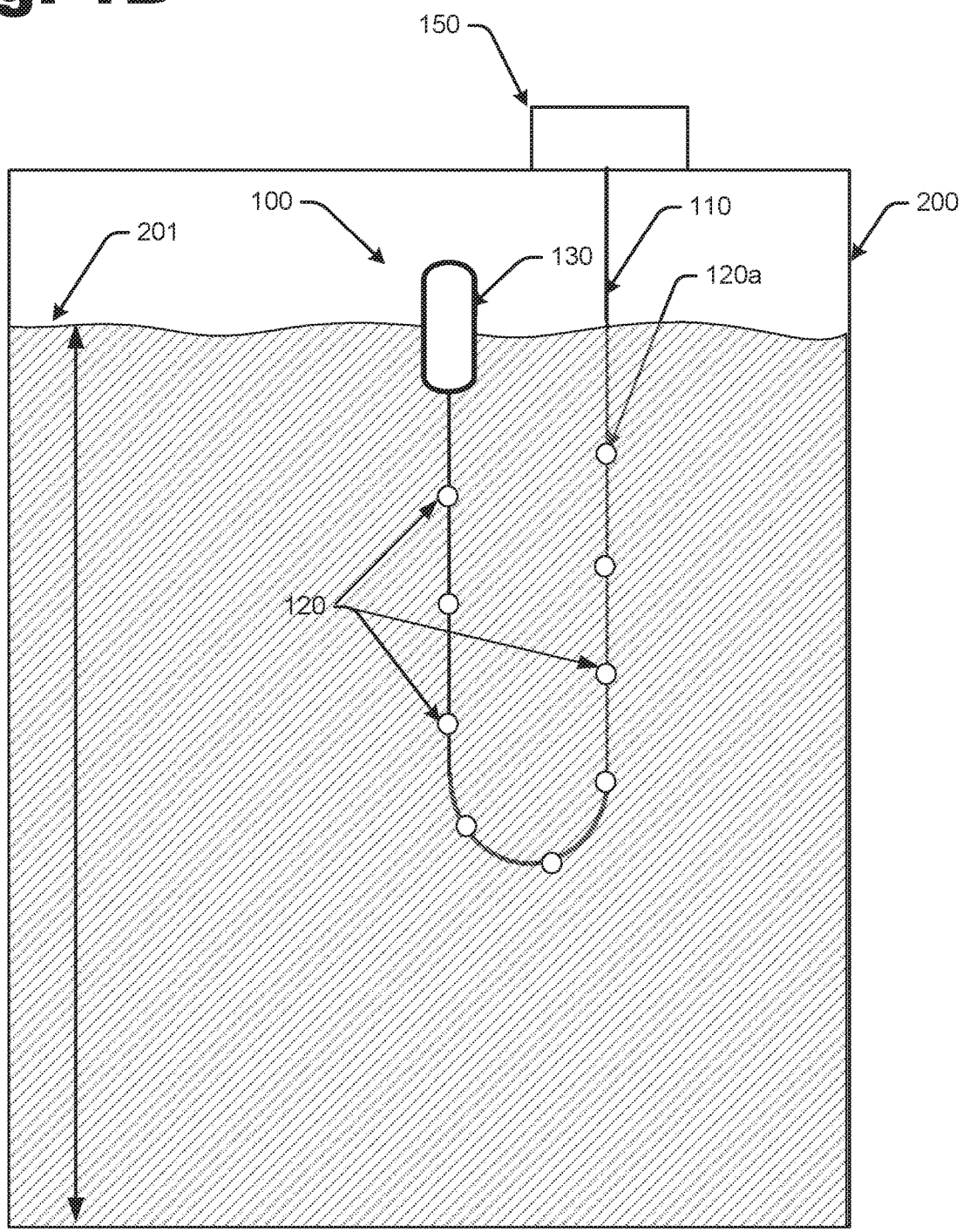
FIG. 1B is an illustration of the example tank fluid level measuring device in a tank with a high liquid level.

FIG. 1B is an illustration of the tank fluid level measuring device in a tank 200 partially filled with a fluid 201 to a depth of more than about 60%. In this example, four of the seven sensor nodes 120 hang in a substantially vertical position, while the other five sensor nodes 120 hang in a non-vertical position. As with the example shown in FIG. 1A, the non-vertical sensor nodes 120 may be presumed to hang beneath the surface of the fluid 201. Since the distance along the flexible member 110 of each sensor node 120 from the monitor 150 is known, the number of sensor nodes 120 that are substantially non-vertical provides information about the depth of the fluid 201 within the tank 200.

As noted in the example above, the submerged portion of the flexible member has three portions. A vertical section on the control unit side, a curved section (a half circle except for at very low tank levels) and another vertical section between the float and the curved section (at tank levels higher than about three feet). Thus there is often a section below the surface where the tilt switches remain in a vertical orientation (in addition to all the no-longer vertical switches).

It will be readily appreciated by those having ordinary skill in the art, after becoming familiar with the teachings herein, that as the level of the fluid 201 rises, such as when the tank 200 is being filled, the buoyant float 130 will rise along with the surface of the fluid 201, and cause successive sensor nodes 120 to tilt away from a substantially vertical orientation as they become submerged. When the tank 200 has been filled to a desired fluid level, the filling process may be commanded to stop, or the tank may be indicated as full. A similar process may be employed for monitoring the level of the tank 200 as it is being emptied, or as it is maintaining a predetermined fluid level.

The monitor 150 may also monitor the sensor nodes 120 and indicate (e.g., via an alert) when a desired level has been reached.

Although nine sensor nodes 120 have been shown in FIG. 1B, it is noted that a different number may be employed.

Before continuing, it should be noted that the examples described herein are provided for purposes of illustration, and are not intended to be limiting. Other devices and/or device configurations may be utilized to carry out the operations described herein.

Figure 2A:
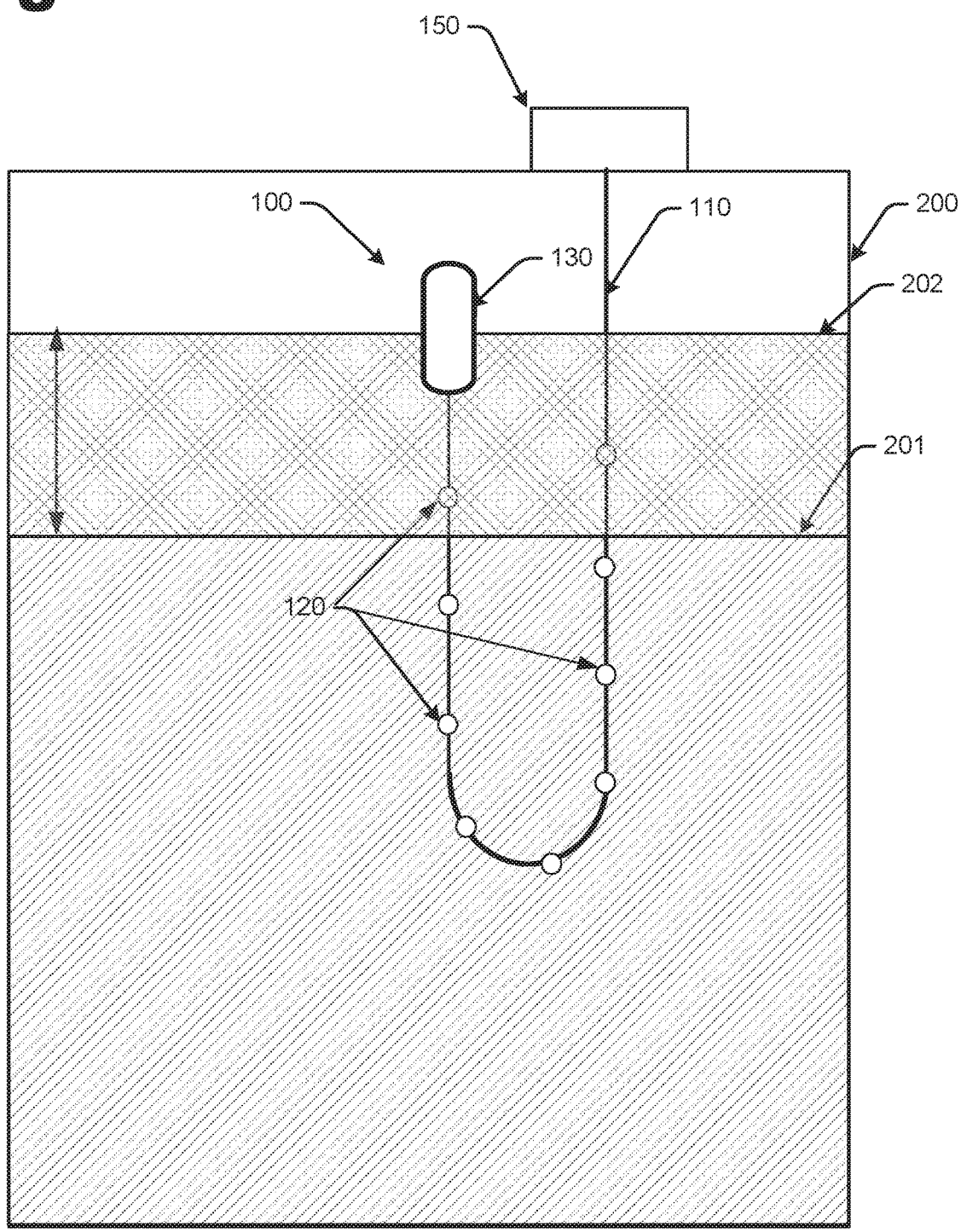
FIG. 2A is an illustration of the example tank fluid level measuring device as it may be implemented to gauge the level of different components of a material (e.g., two or more liquids in the tank).

FIG. 2A is an illustration of the tank fluid level measuring device 100 gauging or measuring the level of a light fluid 202 floating on top of a mutually immiscible heavier fluid 201. In an example, the light fluid 202 is oil which is stored in the tank 200, and the heavier fluid 201 is water which is present in the tank 200 as a contaminant. Other fluids may be measured using the same apparatus and method.

In this example, the oil is less dense than the water, and the oil does not dissolve in the water, thus the two liquids remain generally separated and form two layers of liquid, with the oil on top of the water.

FIG. 2A shows the tank fluid level measuring device 100 configured to gauge the level of the oil. This is accomplished by providing a buoyant float with a specific gravity less than that of both the water and the oil, such that it floats on top of the oil. In operation, the sensor nodes 120 are positioned along the flexible member 110 at different distances from, and suspended from, the monitor 150 and the float 130. The sensor nodes 120 are positioned in the tank 200 to measure the level of one of two fluids within tank 200.

FIG. 2A shows the buoyant float 130 floating at the surface of the light fluid 202 (e.g., the oil), which is shown floating on top of the layer of heavier fluid 201. This is accomplished by configuring the buoyancy of the buoyant float 130 to float on the light fluid 202. As with the example described above for FIGS. 1A and 1B, the monitor may also be configured to indicate (e.g., issue an alert) when a desired level of the light fluid 202 has been reached.

In an example, each sensor node 120 includes a sensor or sensors for monitoring angular displacement. The sensor may comprise, for example, tilt switches, accelerometers, strain gauges, micro-electromechanical system (MEMS) sensors, electrical sensors, among other sensing equipment and circuitry. The sensor node 120 may include sensor circuitry such as amplifiers, analog-to-digital converters, microcontrollers, and other circuitry necessary to read the sensors and communicate the readings to the monitor 150. In an example, each sensor node 120 is configured to indicate when that sensor node 120 changes in a physical configuration, such as when tilted away from a substantially vertical orientation.

The buoyant float 130 provides buoyancy to the far end of the flexible member 110 in a fluid environment. The buoyant float 130 may include an air space, gas bladder, foam, wood, polymer, or other buoyant material or space. In some examples, buoyant float 130 is configured to have a certain specific gravity or relative density, to allow buoyant float 130 to have different buoyancy characteristics in different fluids, such as to float on water but sink in oil, or to float on both water and oil. Other buoyancy characteristics may be employed for different fluids. The buoyant float 130 may comprise a separate device, or may be an element of the flexible member 110. Other configurations are also possible that serve the intended purpose of measuring fluid depth by counting the number of suspended sensor nodes 120 that are misaligned from a substantially vertical orientation.

Figure 2B:
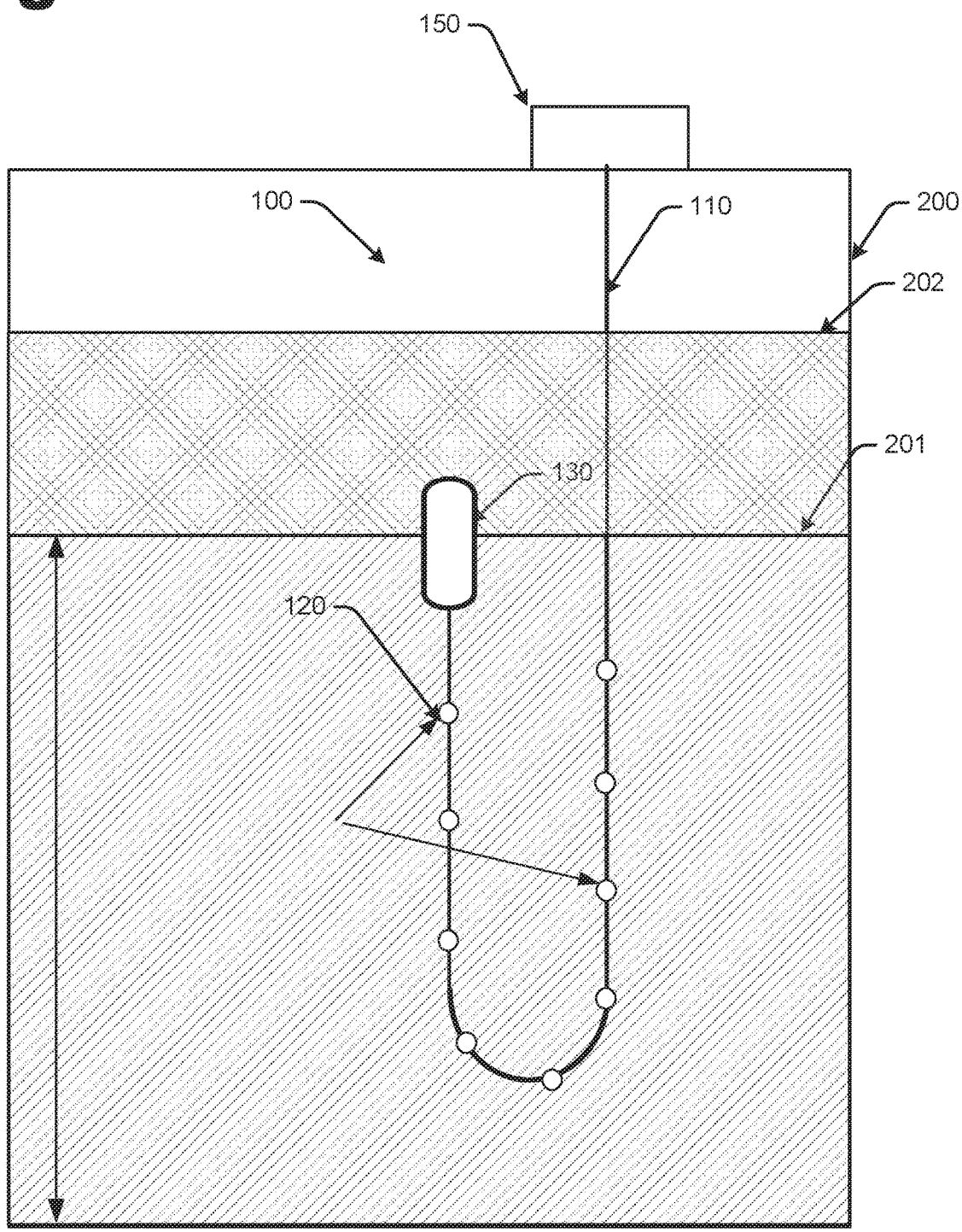
FIG. 2B is an illustration of the example tank fluid level measuring device as it may be implemented to gauge the level of different components of a material (e.g., the heavier of two or more liquids in the tank).

FIG. 2B is an illustration of the tank fluid level measuring device 100 gauging the level of a heavier fluid 201, with a light fluid 202 floating on top. In an example, the tank fluid level measuring device 100 may be configured to gauge the level of water 201 below a layer of oil 202. This is accomplished by using a buoyant float with a specific gravity higher than that of the oil and lesser than that of the water.

In this example, the buoyancy of the buoyant float 130 is configured to float on water but sink in the oil. As described with reference to the examples of FIGS. 1A, 1B, and 2A, the monitor 150 monitors orientation of the sensor nodes 120. The system may also indicate (e.g., alert) when a specified level of the heavier fluid 201 has been reached.

In an example, two or more tank fluid level measuring devices 100 may be employed in the same tank. In this example, each tank fluid level measuring device 100 incorporates a float 130 with a specific gravity selected for the measurement of a different liquid or fluid. Alternatively, two or more flexible members 110 and buoyant floats 130 may be connected to, and monitored by, a single monitor 150, thus forming a single tank fluid level measuring device 100.

In either case, the one or more tank fluid level measuring devices 100 can simultaneously measure the levels of several layered liquids within the same tank 200. This may be, for example, to determine how much of the volume of a full oil tank is taken up by water or other contaminants.

The operations shown and described herein are provided to illustrate example implementations. It is noted that the operations are not limited to the ordering shown. Still other operations may also be implemented. Those skilled in the art will appreciate variations from the examples depicted herein, that nevertheless fall within the scope of the tank fluid level measuring device. Those skilled in the art will also appreciate that the elements and features described above can be combined in various alternative ways to produce equivalent results. The components in the drawings are not necessarily to scale.

Still further operations may include the measurements of fluids or materials that are not necessarily liquids, such as gels, syrups, viscous suspensions (e.g., mud) and fluidized particles (e.g., vibrating beads, grain, or sand particles). The tank fluid level measuring device may also be configured to measure the levels of dense immiscible gases, or of superheated fluids such as molten glass and molten metal, as in a float glass production line. The sensor nodes 120 may be capable of independent communication to a user, regardless of the presence or operational status of a monitor within the tank fluid level measuring device.

It is noted that the examples shown and described are provided for purposes of illustration and are not intended to be limiting. Still other examples are also contemplated.

The invention claimed is:

1. A device for measuring the level of a material in a tank, comprising:
   a non-buoyant flexible member having two ends;
   a plurality of non-buoyant sensor nodes distributed along the length of the non-buoyant flexible member, wherein each of the sensor nodes is configured to indicate when tilted away from a vertical orientation;
   a buoyant float affixed to a second end of the non-buoyant flexible member, the buoyant float configured to float on top of the material in the tank and cause an increasing number of the sensing nodes of the non-buoyant flexible member to depart from a vertical orientation as the level of the material rises in the tank; and
   a monitor in association with the tank that is attached to a first end of the non-buoyant flexible member, the monitor configured to monitor orientation of the sensor nodes.

2. The device of claim 1, wherein the buoyant float is configured to float at an interface between a liquid and a gas in the tank.

3. The device of claim 1, wherein the material comprises at least a first material and a second material, and wherein the buoyant float exhibits a relative density less than the first material but greater than the second material.

4. The device of claim 3, wherein the first material comprises water and the second material comprises oil.

5. The device of claim 1, wherein the non-buoyant flexible member comprises a signal link, and wherein each of the sensor nodes is configured to provide an indication when tilted from a vertical orientation by signaling along the signal link, and wherein the monitor is configured to monitor the signal link to monitor the sensor nodes.

6. The device of claim 1, wherein each of the sensor nodes is configured to communicate over a signal line within the flexible member that is connected to the monitor.

7. The device of claim 1, wherein the flexible member's stiffness or weight is controlled so as to provide a known and controlled bending radius.

8. The device of claim 1, wherein each sensing node is configured to indicate the an amount of tilt of the sensing node from a vertical orientation.

9. The device of claim 1, wherein at least two flexible members and at least two floats are provided, wherein each flexible member and the sensor nodes thereon, is employed to detect the level of a different material within the tank.

10. A device to measure a level of material in a tank, comprising:
a non-buoyant flexible member having two ends;
a plurality of non-buoyant sensor nodes distributed along a length of the non-buoyant flexible member, wherein each of the plurality of sensor nodes is configured to generate an indication when tilted away from vertical orientation;
a buoyant float affixed to a second end of the flexible member, wherein the buoyant float rises and falls with a level of the material in the tank and causes an increasing number of sensing nodes to depart from vertical as the level of the material rises, and causes a decreasing number of sensing nodes to depart from vertical as the level of material falls; and
a monitor configured to monitor each of the plurality of sensor nodes.

11. The device of claim 10, wherein the the buoyant float sits at an interface between a gas and a liquid.

12. The device of claim 10, wherein the the buoyant float sits at an interface between a two immiscible liquids of different density.

13. The device of claim 12, wherein the buoyant float exhibits a relative density less than a first component of the material, but greater than a second component of the material.

14. The device of claim 13, wherein the first component comprises water and the second component comprises oil.

15. The device of claim 10, wherein the flexible member comprises a signal link, and wherein monitoring the sensor nodes comprises the monitor monitoring the signal link.

16. The device of claim 10, further comprising in each of the sensor nodes, communicating over a communications line within the flexible member that communicates with the monitor.

17. The device of claim 10, wherein one or more of the sensor nodes communicate wirelessly with the monitor.

18. A device for measuring the level of material within a tank, comprising:
a non-buoyant flexible member having two ends, one of the two ends affixed near a top of the tank;
a plurality of non-buoyant sensor nodes distributed along a length of the non-buoyant flexible member, wherein each of the plurality of sensor nodes is configured to indicate when an orientation of the sensor node is tilted away from a vertical orientation; and
a buoyant float affixed to the other of the two ends of the non-buoyant flexible member to float on top of the material and causes a change in orientation of the sensing nodes as a level of the material changes in the tank.

19. The device of claim 18, wherein the buoyant float exhibits a relative density less than a first component of the material and greater than a second component of the material.

20. The device of claim 19, wherein the first component comprises a first liquid and the second component comprises a second liquid, the second liquid is less dense than the first liquid and is immiscible with the first liquid to float on top of the first liquid.

* * * * *